(12) United States Patent
Morley et al.

(10) Patent No.: US 6,278,777 B1
(45) Date of Patent: Aug. 21, 2001

(54) SYSTEM FOR MANAGING AGENT ASSIGNMENTS BACKGROUND OF THE INVENTION

(75) Inventors: Peter D. Morley, Falls Church; Jonathan Wineberg, Leesburg, both of VA (US)

(73) Assignee: SER Solutions, Inc., Herndon, VA (US)

( * ) Notice: Subject to any disclaimer, the term of this patent is extended or adjusted under 35 U.S.C. 154(b) by 0 days.

(21) Appl. No.: 09/505,710

(22) Filed: Feb. 17, 2000

Related U.S. Application Data

(63) Continuation-in-part of application No. 09/038,964, filed on Mar. 12, 1998, now abandoned.

(51) Int. Cl.[7] .......................... H04M 3/523; H04M 3/44; H04Q 3/64
(52) U.S. Cl. ............................................. 379/265; 379/216
(58) Field of Search .................................... 379/216, 265, 379/266, 309

(56) References Cited

U.S. PATENT DOCUMENTS

| | | | |
|---|---|---|---|
| 4,881,261 | 11/1989 | Oliphant et al. | 379/265 |
| 5,179,589 | 1/1993 | Syu | 379/265 |
| 5,185,780 | * 2/1993 | Leggett | 379/266 X |
| 5,206,903 | 4/1993 | Kohler et al. | 379/266 |
| 5,214,688 | 5/1993 | Szlam et al. | 379/265 |
| 5,299,260 | 3/1994 | Shaio | 379/265 |
| 5,465,286 | 11/1995 | Clare et al. | 379/265 |
| 5,506,898 | 4/1996 | Costantini et al. | 379/266 |
| 5,570,419 | * 10/1996 | Cave et al. | 379/216 |
| 5,594,791 | 1/1997 | Szlam et al. | 379/265 |
| 5,642,411 | 6/1997 | Theis | 379/265 |
| 5,721,770 | 2/1998 | Kohler | 379/266 |
| 5,740,238 | 4/1998 | Flockhart et al. | 379/265 |
| 5,754,639 | 5/1998 | Flockhart et al. | 379/265 |
| 5,784,452 | 7/1998 | Carney | 379/265 |
| 5,825,869 | 10/1998 | Brooks et al. | 379/265 |
| 5,828,747 | 10/1998 | Fisher et al. | 379/265 |
| 5,889,799 | 3/1999 | Grossman et al. | 379/266 |
| 5,903,641 | 5/1999 | Tonisson | 379/265 |
| 5,905,793 | 5/1999 | Flockhart et al. | 379/266 |
| 5,907,601 | 5/1999 | David et al. | 379/266 |
| 5,915,011 | 6/1999 | Miloslavsky | 379/266 |
| 5,926,528 | 7/1999 | David | 379/266 |
| 5,940,497 | 8/1999 | Miloslavsky | 379/265 |
| 5,946,375 | 8/1999 | Pattison et al. | 379/265 X |

* cited by examiner

*Primary Examiner*—Harry S. Hong
(74) *Attorney, Agent, or Firm*—Andrew C. Aitken; Venable

(57) ABSTRACT

A system in which agents are transferred based on the future performance parameter of a call center predicted from the trend of current samples. In a multi-media call center, the performance parameter may be any defined variable, such as profit per contact, incoming call wait time, etc. The agents being transferred come from any agent activity such as web chat, e-mail, another incoming call campaign, an outgoing call campaign, etc.

3 Claims, 3 Drawing Sheets

SYSTEM FOR MANAGING AGENT ASSIGNMENTS BACKGROUND OF THE INVENTION

CROSS REFERENCE TO RELATED APPLICATION

This is a continuation-in-part of Ser. No. 09/038,964, filed on Mar. 12, 1998, now abandoned.

BACKGROUND OF THE INVENTION

1. Field of the Invention

This invention relates to an improved system for managing agent assignments in a call center environment in which agents are transferred from one agent activity to another based upon a performance parameter and, more particularly, to an improved system that anticipates short term imbalances between a need for agents to meet performance parameters and agent assignments.

2. Description of the Prior Art

As will be appreciated by those skilled in the art, commercially available systems, which automatically connect incoming calls to an agent, offer a range of functional capabilities. Many of these Automatic Call Distributor (ACD) systems are capable of simultaneously running multiple tasks with some agents logged on to one task and other agents logged on to another task. Here it should be noted, the current trend in call center systems is to have full multi-media capabilities, which includes incoming and outgoing telephony calls, web chats, e-mails and other advanced Internet contacts, so that the blending function transfers agents among these activities.

For example, there are prior art systems that blend inbound automatic call distribution agents and automatic outbound calling agents in order to improve staffing efficiency. Inbound call distribution typically has peaks and valleys in its operation since the demand is generated by outside callers. By linking inbound and outbound call functions, outbound agents can be switched to inbound duty during peak inbound demand periods and switched back to outbound duty during slack periods in inbound demand, thus improving overall staffing efficiency.

In typical prior art systems, an inbound performance parameter is monitored based upon statistics tracked by the inbound call distributor; for example, number of calls in the inbound queue or average time to answer an inbound call. Target values and upper and lower thresholds are established for the performance parameter; for example a five second target to respond to incoming calls with an upper threshold of seven seconds and a lower threshold of three seconds. The assumption of the thresholds is: if upper threshold is exceeded the performance is unacceptable, and more inbound agents are needed; if the lower threshold is exceeded, the inbound function is considered to be overstaffed and overall efficiency would be improved by transferring inbound agents to outbound operations.

In the prior art, agents are typically transferred, as they become available, when the upper or lower threshold values ale exceeded. Agents continue to be transferred until the performance parameter is between the upper and lower threshold limits, when the transfer stops. U.S. Pat. No. 5,425,093, assigned to the assignee of this application and incorporated herein by reference, discloses the concept of providing hysteresis to provide added stabilization to agent transfer.

More generally, systems can monitor a call center's performance parameters, such as service times, in-queue times, call volumes, call abandonment rates, benefits derived from having different agents handle calls requiring different skills, proportions of work (e.g., time or calls handled) spent by agents on handling calls requiring different skills, etc., and automatically adjusts agents' call-handling assignments, for example, by changing the skills to which an agent is assigned (logged into) or by changing the relative priorities (levels of expertise) of the agent's skills, in order to optimize a predefined objective or objectives. The objective is a selected performance characteristic of the call center, such as the total benefit to the call center of individual ones of the agents handling calls requiring individual agent skills.

U.S. Pat. No. 5,185,780 discloses a work force management system for predicting agent requirements in such systems. This system uses historic average load data at specific times to forecast agent requirements at a comparable future times; for example the average load on Tuesday between 10:00 a.m. and 11:00 a.m. is used to predict the load on the following Tuesday between 10:00 a.m. and 11:00 a.m. These initial forecasts, which are used to calculate agent requirements at some comparable future time, are not based on the system experience at that future time. However, these initial forecasts are compared with actual data and the initial forecasts can be modified by means of a weighting factor based on the difference between the initial forecast and data accumulated from the system in operation at the future time for which the initial forecast was made. Here it should be noted, the weighting factor is based on the difference between the initially forecast values and the experience values.

SUMMARY OF THE INVENTION

An object of this invention is the provision of an improved call center balancing system that efficiently transfers agents in response to unanticipated short term changes in a call center's defined performance parameter. Another object of the invention is to maintain a call center's performance parameter (e.g. desired wait time for incoming calls or revenue per contact) by monitoring the parameter's current short term time history, and switching multi-media agents in response to predicted future values.

Briefly, this invention contemplates the provision of a system in which agents are transferred based on the future performance parameter of a call center predicted from the trend of current samples. In a multi-media call center, the performance parameter may be any defined variable, such as profit per contact, incoming call wait time, etc. The agents being transferred come from any agent activity such as web chat, e-mail, another incoming call campaign, an outgoing call campaign, etc.

In matching agent assignments with performance parameter requirements in accordance with the teachings of this invention, two or more current samples of the call center's performance parameter (or samples of a parameter that determines the performance parameter, such as inbound call load) are taken at time spaced intervals and the trend of the sampled parameter is projected to a future time in order to predict whether or not a change of agent assignments should be made in order to maintain the performance parameter within acceptable limits. In a preferred embodiment of the invention, the call center balance algorithm uses a Taylor expansion to predict the future value of a performance parameter from a series of two or more discrete data samples separated in time. For some applications a single term of the expansion is adequate. For other applications, the first and second terms are used advantageously to predict the future value. Here the word "acceleration" is used to connote a second derivative of the function whose value is to be predicted and the word "velocity" to connote the first derivative.

BRIEF DESCRIPTION OF THE DRAWINGS

The foregoing and other objects, aspects and advantages will be better understood from the following detailed description of a preferred embodiment of the invention. in which.

DETAILED DESCRIPTION OF A PREFERRED EMBODIMENT

Figure 1:
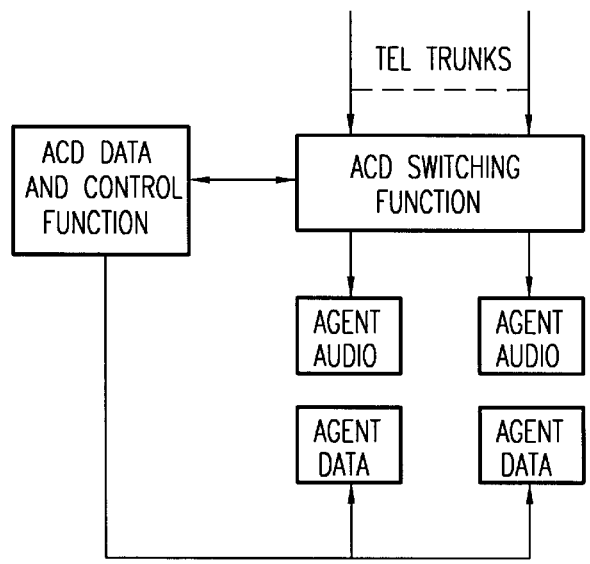
FIG. 1 is block diagram of typical inbound/outbound call center system in current commercial use and with which the improved method for agent blending, which is the subject of this invention, can used.

U.S. Pat. No. 5,425,093 illustrates one prior art inbound-outbound call center system with blended operations. That call center system contemplates separate inbound and outbound functions, which control respectively separate inbound and outbound switches. The blending system of this application can be implemented advantageously in such systems with separate inbound and outbound functions. In fact, as will become apparent to those skilled in the art, the system of this application is independent of any particular call center hardware or architecture, and can be used advantageously in all call center systems. Here it should be noted, the current trend in call center systems is to add software modules to the inbound call distributor system so that the inbound call distributor performs both inbound and outbound functions including the blending function to which this invention is directed. FIG. 1 is a simplified block diagram illustrating a call center system in which a commercially available automatic call distributor includes application programs to allow it to perform both inbound and outbound functions, including the agent blending function in accordance with the teachings of this invention.

Figure 2:
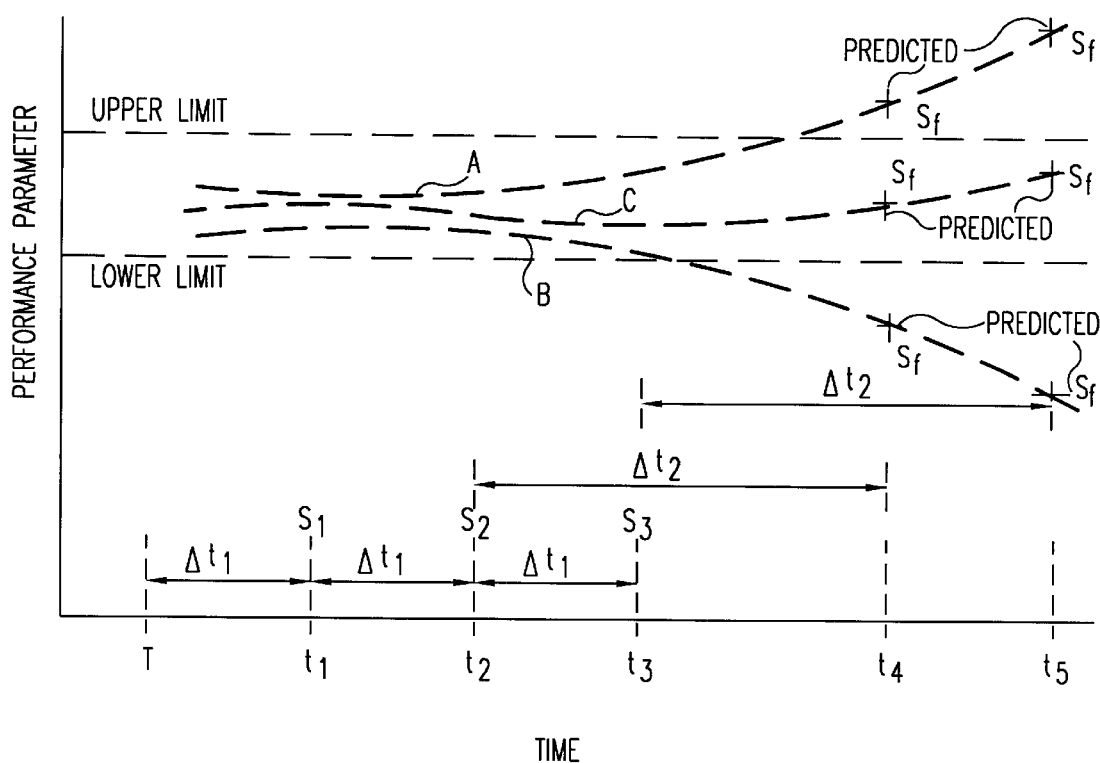
FIG. 2 is a diagram illustrating short term traces of a call center performance parameter value as a function of time.

Referring now to FIG. 2, it shows three illustrative traces (A, B, and C) of a center performance parameter as it changes with respect to time and a projection of these parameters to a future time. The current trend in call center systems is to have full multi-media capabilities, which includes incoming and outgoing telephony calls, web chats, e-mails, and other advanced Internet contacts, so that the blending function transfers agents among these activities. In the multi-media call center, the performance parameter may be any defined variable, such as profit per contact, incoming call wait time, etc. The agents being transferred come from any agent activity such as web chat, e-mail, another incoming call campaign, an outgoing call campaign, etc. In trace A, the performance parameter is improving at successive times $t_1$, $t_2$, and $t_3$. In B, the performance parameter improves slightly between $t_1$, and $t_2$ and $t_3$. In FIG. C, the performance parameter stays between the upper and lower limits.

Using samples of the performance parameter, an algorithm or routine known in the art is used to predict the value of the performance parameter a short time (e.g., five seconds) in the future. In a preferred embodiment, a Taylor expansion routine is used. Two samples $S_1$ and $S_2$ of the call center's performance parameter, calculated at recent times (units of seconds for time) $t_1$, $t_2$ respectively, with $t_2 > t_1$, and separated by an interval $\Delta t_1$. The first term of Taylor expansion is a first derivative ("velocity") routine, which computes the slope S of the performance parameter by $(S_2 - S_1)/(t_2 - t_1) = S$ and predicts the value of the performance parameter $(S_f)$. $\Delta t_2$ seconds in the future by: $S_2 + S\Delta t_2 = S_f$.

The second Taylor expansion term is a second derivative "acceleration" prediction routine, which uses three samples $S_1$, $S_2$, $S_3$ taken at recent times $t_1$, $t_2$, $t_3$ (units of seconds for time) with $t_3 - t_2 = t_2 - t_1 = \Delta t_1$. The predicted value for the call center performance parameter $S_f$, $\Delta t_2$ seconds into the future is:

$$S_f = S_3 + \{(S_3 - S_2)/\Delta t_1\}\Delta t_2 + 0.5\{S_3 - 2S_2 + S_1)/(\Delta t_1 * \Delta t_1)\}\Delta t_2 * \Delta t_2 \quad \text{Eq}(1)$$

In order to accommodate rapidly fluctuating performance parameters, in the preferred embodiment of the invention $\Delta t_2$ is 5–10 seconds in value.

The instantaneous performance parameter fluctuates as a function of time, and the samples $S_1$, $S_2$ and $S_3$ are averages. The averaged performance parameter varies in time due to the changing conditions (e.g. sudden increase of incoming phone calls because of a TV commercial running). The system of this invention uses data that provides current, real-time, future predictions. Yesterday's data is not deemed relevant to what happens in the next minute.

The system starts taking samples of the performance parameter value at time T=start, and then after a short interval of $\Delta t_1$, (in seconds) computes the average value $S_1$, of the performance parameter by adding the sample values and dividing by the number of samples. Going ahead another time interval $\Delta t_1$ the system computes the average value of the performance parameter $S_2$ by adding the sample values over the interval from T to $t_2$(i.e. $2\Delta t_1$) and dividing by the number of samples. If the instantaneous performance parameter fluctuates on the time scale of seconds, then $S_1$ and $S_2$ will be, in general, different. The system has enough information to compute the first derivative, which is $S = (S_2 - S_1)/\Delta t_1$. This first derivative can then be used to estimate the future value $S_f$ of the (averaged) performance value at $t_4$ seconds in the future; (i.e. the future estimated value of the (averaged) performance parameter at $\Delta t_2$ seconds in the future from time T (start)+$2*\Delta t_1$)$S_f = S_2 + S*\Delta t_2$.

Going ahead another time interval of $\Delta t_1$, the system computes the average of the performance parameter again, for time $t_3$ by adding the sample values from T to $t_3$ and dividing by the number of samples. The new slope is $(S_3 - S_2)/\Delta t_1$. The new future predicted value of the (averaged) performance value $\Delta t_2$ seconds into the future from time T (start) +$3* \Delta t_1$ is $S_f = S_3 + \{(S_3 - S_2)/\Delta t_1\}\Delta t_2$.

The second derivative uses $S_1$, $S_2$, and $S_3$ in the above formula Eq(1) to make the future prediction $S_f$. In this exemplary embodiment, the two most current values of the performance parameter are used for the first term of the Taylor expansion and the three most current values are used for the second term of the Taylor expansion. To maintain the freshness of the data, the systems periodically stops the averaging process (e.g., after 2 minutes) and begins anew.

There are a number of performance measurement that can be used alone or in combination as a indication of the responsiveness of the center to inbound calls. Two widely used measurements are the number of calls in the inbound queue awaiting initial connection to an agent, and the time between when a call is answered and when the caller is connected to an agent. It will be appreciated that the blending system of this invention is independent of any particular performance measurement, but for ease of explanation here in connection with FIG. 2 it will be assumed the performance measurement is the time (in seconds) between the time a call is answered and the time the caller is connected to an agent. The diagrams of FIG. 2 assumes a target caller wait time target of five seconds, with an upper limit of seven seconds and a lower limit of three seconds. Obviously, the target, upper, and lower limits can be set to other desired values. Exceeding (i.e. rising above) the upper limit is assumed to be an undesirable call center operation because it keeps callers waiting too long. Exceeding (i.e. dropping below) the lower limit is assumed to be an undesirable call center operation because it makes inefficient use of the available agents. Here it will be appreciated that having a band of acceptable performance between upper and lower limits discourages indiscriminate transfer of agents. Referring to FIG. 2, A illustrates a predicted performance parameter above the upper limit (illustrated to be seven seconds), and agents are transferred to inbound operations. In B, the predicted performance parameter is below the lower limit (illustrated to be three seconds), and the system signals to transfer agents from inbound operations to other operations. In C, the predicted performance parameter stays within limits and there is no agent transfer. Agents are typically transferred as they become available until the predicted performance parameter value is between the upper and lower limits of its range.

Figure 3:
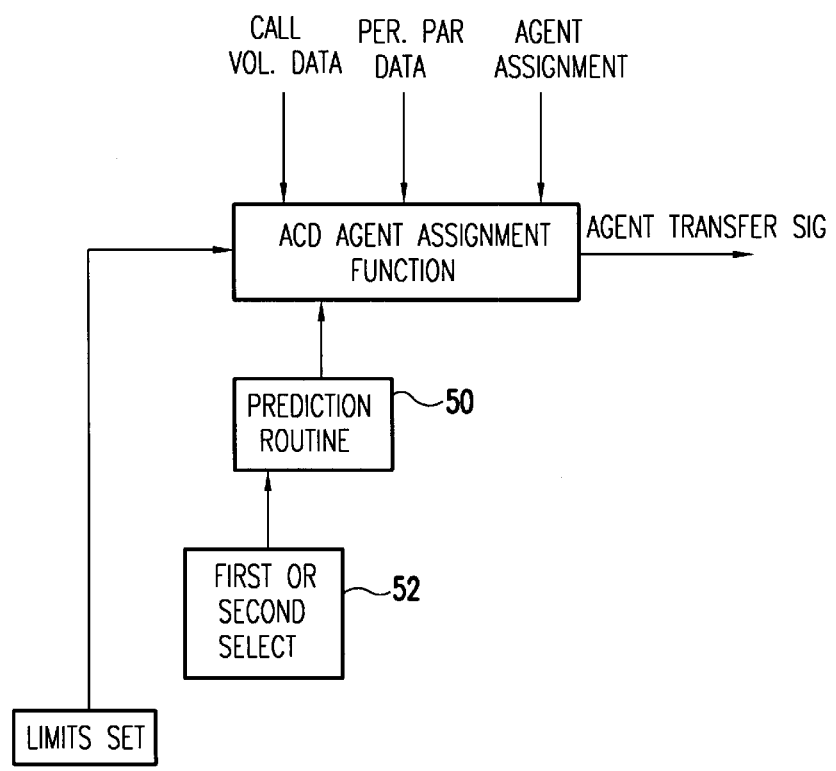
FIG. 3 is a functional block diagram of a call center system in accordance with the teachings of this invention.

Referring now to FIG. 3, it illustrates the system of the invention in terms of a functional block diagram. Here it will be appreciated that the system components for tracking inbound call volume, number of available agents, and performance are available in commercially available automatic call distributors available from Lucent Technologies Co., among others. The agent assignment system of the invention includes performance parameter prediction module 50, which predicts the performance parameter value at the end of a short, future interval, tests the predicted value against upper and lower limits, and generates a signal to transfer agents if the predicted value is outside the limits. A switch 52 allows the call center to select either the first derivative "velocity" or second derivative "acceleration" routine depending upon the nature of the short term changes in call center performance.

Figure 4:
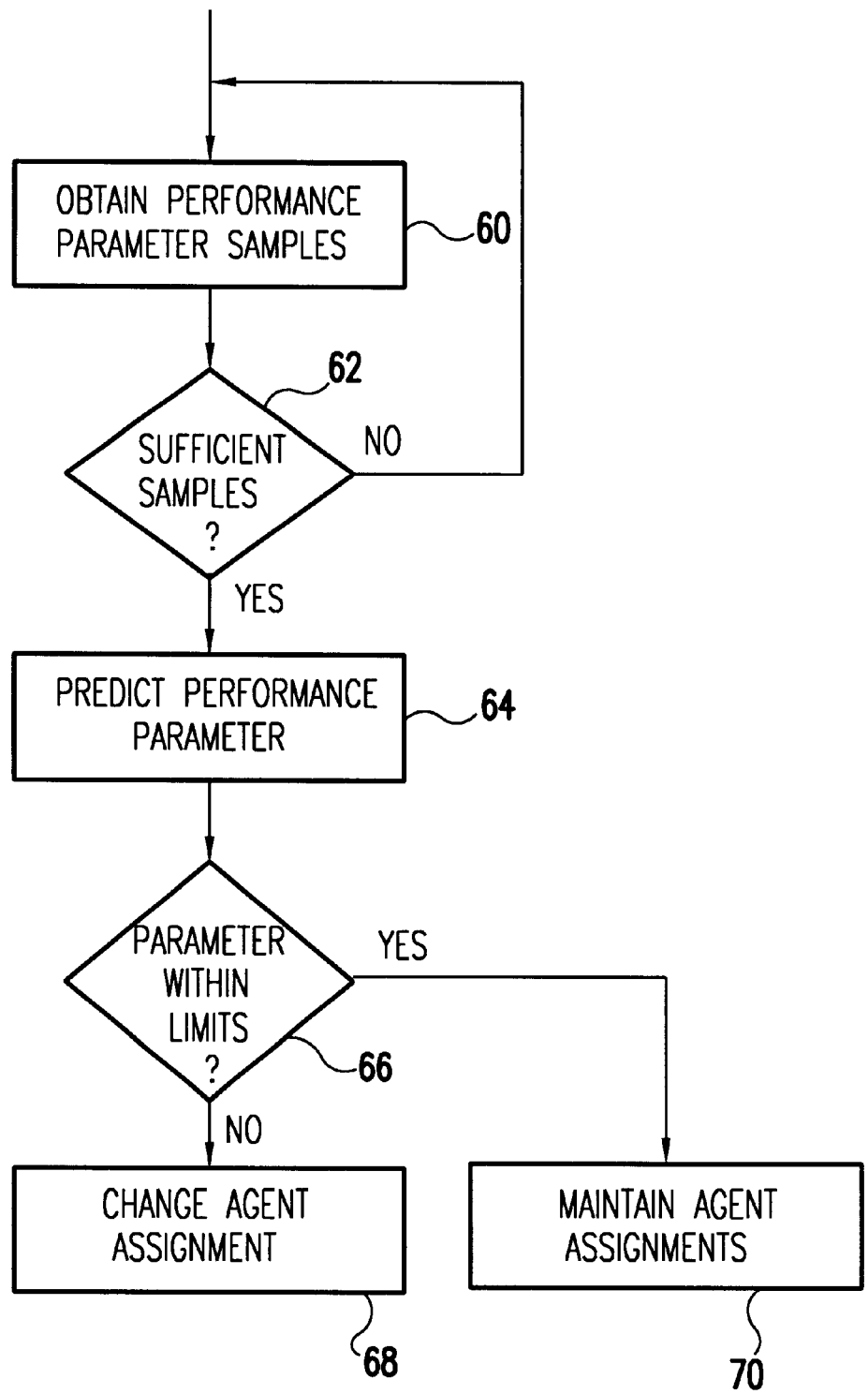
FIG. 4 is a flow diagram of the operation of the call blending system of this invention.

Referring now to FIG. 4, the process initially obtains two samples or three samples of the performance parameter (block 60) depending upon whether the call center has selected the first derivative routine or second derivative routine. When sufficient samples have been obtained, block 62, the system predicts the performance parameter at the end of a short (e.g. 5–10 seconds) interval, block 64. At decision block 66, the predicted performance parameter is compared to limits. If the limits are exceeded, agent assignments are changed, block 68. If these are not exceeded, the agent assignments are left unchanged, block 70.

It will be appreciated that, as disclosed in copending application Ser. No. 09/038,964, which is incorporated herein by reference, other routines can be used to project the trend of sample values and predict a future value. In addition, the Taylor expansion routine can be used to predict call center parameters such as inbound load and a determination made as to whether or not change agent assignments based upon predicted load, as disclosed in the copending application Ser. No. 09/038,964.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A call center agent method for transferring agents between one agent activity to another activity, which agent activities are concurrently active in a call center in order to maintain a call center performance parameter within an acceptable range, including the steps of:

obtaining, periodically, a sample value of the performance parameter;

predicting the performance parameter at a future time by projecting a trend established by at least two samples of said performance parameter to said future time;

determining whether or not the predicted performance parameter will be outside of an acceptable range at future times;

signaling for the transfer of agents to bring the predicted performance parameter inside an acceptable range if the determining step determines the predicted performance will be outside the acceptable range;

repeating during said concurrently running activities said obtaining, predicting, determining, and signaling steps to maintain said performance parameter within said acceptable range.

2. A call center agent method as in claim 1, wherein said predicting step uses a first derivative with respect to time of the change in two of the sample values to determine a predicted performance value.

3. A call center agent method as in claim 1, wherein said predicting step uses the first and second terms of a Taylor expansion to determine a predicted performance value from three sample values.

\* \* \* \* \*